(12) United States Patent
Tokutomi et al.

(10) Patent No.: US 8,154,654 B2
(45) Date of Patent: Apr. 10, 2012

(54) FRAME INTERPOLATION DEVICE, FRAME INTERPOLATION METHOD AND IMAGE DISPLAY DEVICE

(75) Inventors: Hideaki Tokutomi, Ome (JP); Himio Yamauchi, Yokohama (JP); Toshiyuki Namioka, Tokorozawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1091 days.

(21) Appl. No.: 11/948,213

(22) Filed: Nov. 30, 2007

(65) Prior Publication Data

US 2008/0131030 A1 Jun. 5, 2008

(30) Foreign Application Priority Data

Nov. 30, 2006 (JP) ................. 2006-324623

(51) Int. Cl.
*H04N 7/01* (2006.01)
(52) U.S. Cl. ..................................... 348/448
(58) Field of Classification Search .......... 348/448, 348/441, 443, 459, 458, 445, 911, 910, 446–447
See application file for complete search history.

(56) References Cited

U.S. PATENT DOCUMENTS

| | | | | |
|---|---|---|---|---|
| 5,291,280 A * | 3/1994 | Faroudja et al. | ......... | 375/240.12 |
| 6,111,610 A * | 8/2000 | Faroudja | ......... | 348/441 |
| 6,222,589 B1 * | 4/2001 | Faroudja et al. | ......... | 348/448 |
| 7,020,197 B2 | 3/2006 | Tanase et al. | | |
| 7,098,959 B2 | 8/2006 | Mishima et al. | | |
| 7,106,380 B2 * | 9/2006 | Willis | ......... | 348/459 |
| 7,158,186 B2 * | 1/2007 | Selby et al. | ......... | 348/459 |
| 7,180,548 B2 * | 2/2007 | Mishima et al. | ......... | 348/441 |
| 7,548,276 B2 * | 6/2009 | Mizuhashi et al. | ......... | 348/459 |
| 7,602,440 B2 * | 10/2009 | Nishi et al. | ......... | 348/441 |
| 7,961,251 B2 * | 6/2011 | Shen et al. | ......... | 348/446 |

FOREIGN PATENT DOCUMENTS

| | | |
|---|---|---|
| JP | 09-181967 | 7/1997 |
| JP | 11-88845 A | 3/1999 |
| JP | 11-243507 | 9/1999 |
| JP | 11-513541 | 11/1999 |
| JP | 2000-165742 A | 6/2000 |
| JP | 2002-359775 | 12/2002 |
| JP | 2004-15700 A | 1/2004 |
| JP | 2004-159294 A | 6/2004 |
| JP | 2004-302045 | 10/2004 |

OTHER PUBLICATIONS

Japanese Office Action dated Nov. 1, 2011.

* cited by examiner

*Primary Examiner* — Paulos Natnael
(74) *Attorney, Agent, or Firm* — Pillsbury Winthrop Shaw Pittman, LLP

(57) ABSTRACT

According to one embodiment, a frame interpolation device includes a detecting section which receives a frame signal of 60 Hz and outputs a pull-down detection signal when determining that the frame signal is a pull-down signal, a generation section which generates a first frame signal of 120 Hz by use of a first insertion pattern based on the frame signal of 60 Hz and a second frame signal of 120 Hz by use of a second insertion pattern, and a selecting section which outputs the first frame signal by the first insertion pattern when the pull-down detection signal is not received and outputs the second frame signal of 120 Hz of the second insertion pattern when the pull-down detection signal is received.

5 Claims, 12 Drawing Sheets

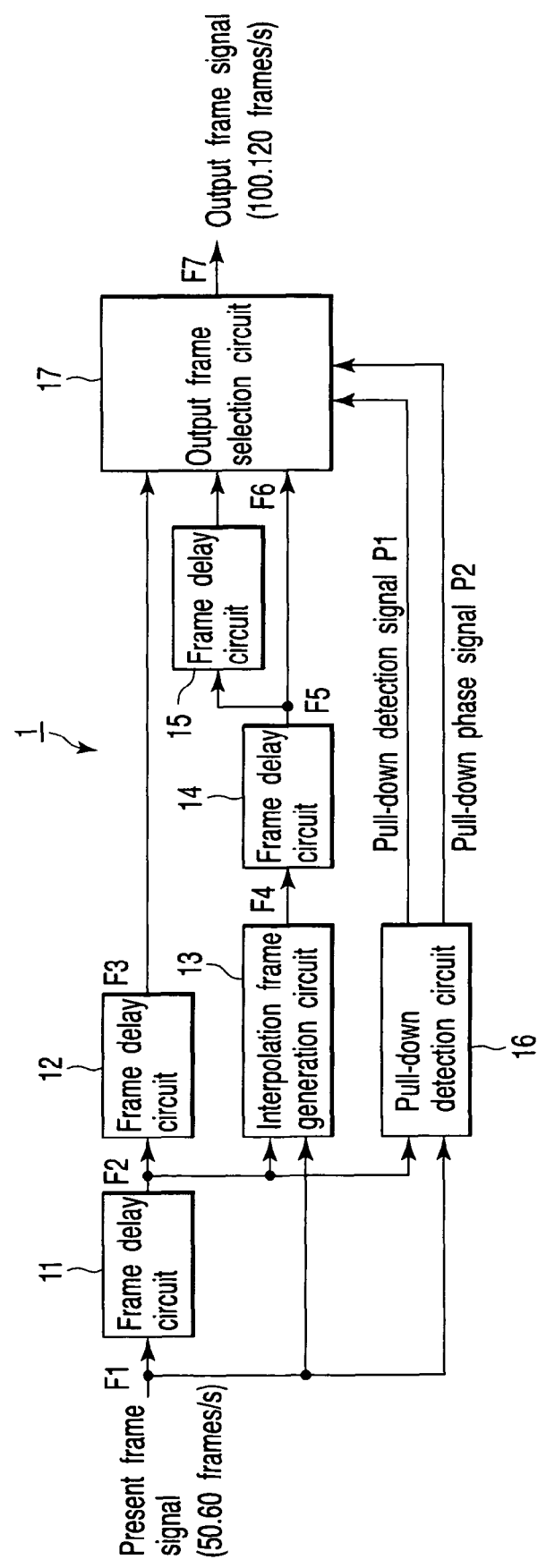
F I G. 1

FIG. 8  Embodiment of output frame selection circuit in 2-3 pull-down process

FRAME INTERPOLATION DEVICE, FRAME INTERPOLATION METHOD AND IMAGE DISPLAY DEVICE

CROSS-REFERENCE TO RELATED APPLICATIONS

This application is based upon and claims the benefit of priority from Japanese Patent Application No. 2006-324623, filed Nov. 30, 2006, the entire contents of which are incorporated herein by reference.

BACKGROUND

1. Field

One embodiment of the present invention relates to a frame interpolation device and more particularly to a frame interpolation device, a frame interpolation method and an image display device which deal with a pull-down signal.

2. Description of the Related Art

Recently, a flat-panel display device such as a large-scale liquid crystal display device has been developed and is popularly used instead of the conventional cathode-ray tube display device. In such a liquid crystal display device, a video signal is displayed according to a standard of 60 Hz (50 Hz in the case of PAL, SECAM) in the case of NTSC, for example. On the other hand, since a cinema signal is formed of 24 frames per second and cannot be displayed on a television receiver as it is, it is necessary to subject the cinema signal to a pull-down process.

In Patent Document 1 (Jpn. Pat. Appln. KOKAI Publication No. 2004-159294), a method is provided to convert a cinema signal of 24 Hz into a moving picture of 48 Hz by forming one interpolation frame for every two frames of the cinema signal of 24 Hz, successively display two original frames for every four frames of the signal of 48 Hz to convert four frames into five frames so as to convert 48 Hz into 60 Hz.

However, the conventional technique disclosed in Patent Document 1 cannot solve the following problem. That is, for example, in the liquid crystal display device which is the display device supplied with a video signal of 60 Hz, there occurs a problem that an afterimage or deformation occurs in a video image which quickly moves, but the above conventional technique cannot cope with this problem. In the conventional technique, a video signal processing method for displaying a signal of 120 Hz by interpolating four frames is described, but since the circuit scale becomes extremely large in order to form a plurality of interpolation frames based on two original frames and it is difficult to attain the above operation. Therefore, there occurs a problem that the problem of how to attain a video signal of, for example, 120 Hz and display a smooth video image by subjecting a video signal of 60 Hz to the interpolation process in the display device cannot be coped with. Further, in the above conventional technique, there occurs a problem that the technique for more smoothly displaying a video signal by performing different processes depending on whether or not the video signal of 60 Hz is a pull-down signal is not disclosed.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a block diagram showing one example of the configuration of a frame interpolation device according to one embodiment of this invention.

DETAILED DESCRIPTION

Various embodiments according to the invention will be described hereinafter with reference to the accompanying drawings. In general, according to one embodiment of the invention, a frame interpolation device comprising: a detecting section which receives a frame signal of one of 50 Hz and 60 Hz and detects whether the frame signal is a pull-down signal, first generation section for generating a first frame signal of one of 100 Hz and 120 Hz by use of a first insertion pattern based on the frame signal of one of 50 Hz and 60 Hz, second generation section for generating a second frame signal of one of 100 Hz and 120 Hz by use of a second insertion pattern based on the frame signal of one of 50 Hz and 60 Hz, and a selecting section which outputs the first frame signal received from the first generation section when the frame signal is not a pull-down signal and outputs the second frame signal from the second generation section when the frame signal is a pull-down signal.

An embodiment of the present invention will be described in detail with reference to the accompanying drawings.

<Frame Interpolation Device According to One Embodiment of this Invention>

Figure 2:
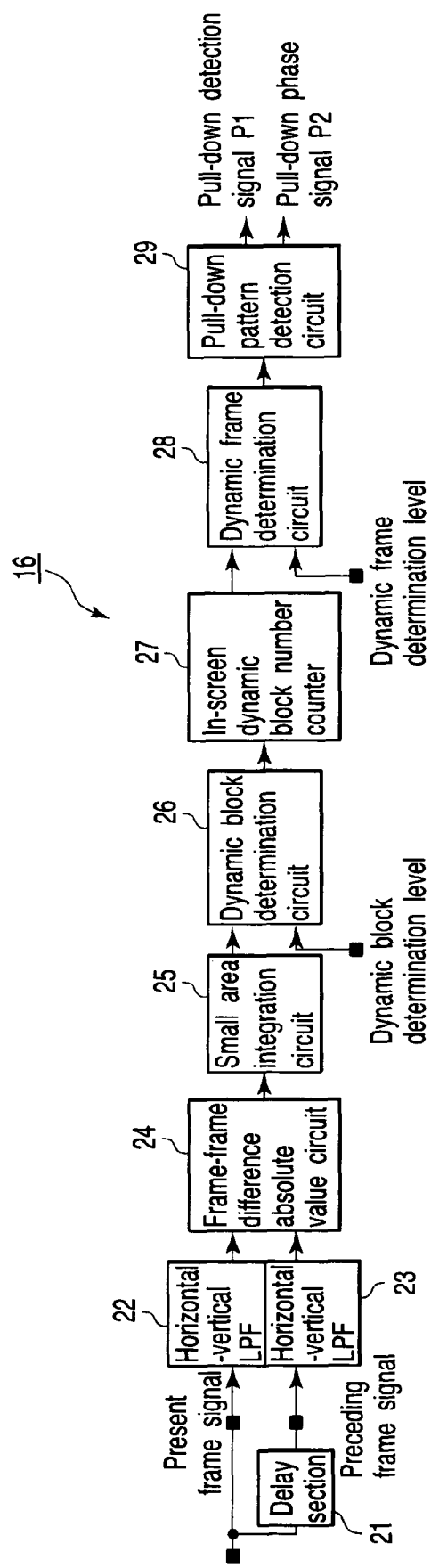
FIG. 2 is a block diagram showing one example of the configuration of a pull-down detection circuit contained in the frame interpolation device according to one embodiment of this invention.

One example of a frame interpolation device according to one embodiment of this invention is explained in detail with reference to FIG. 1. FIG. 1 is a block diagram showing one example of the configuration of the frame interpolation device according to one embodiment of this invention. FIG. 2 is a block diagram showing one example of the configuration of a pull-down detection circuit contained in the frame interpolation device according to one embodiment of this invention.

As shown in FIG. 1, the frame interpolation device 1 according to one embodiment of this invention includes a frame delay circuit 11 which is supplied with a present frame signal of 50 Hz (PAL, ECAM specification) or 60 Hz (NTSC specification), delays the present frame signal and generates a one-frame delay signal, a frame delay circuit 12 which further delays an output of the frame delay circuit 11, and an interpolation frame generation circuit 13 which generates an interpolation frame based on the present frame signal and one-frame delay signal. Further, the frame interpolation device 1 includes a frame delay circuit 14 which is connected to the output of the interpolation frame generation circuit 13 to perform the frame delay operation, a frame delay circuit 15 which further delays an output signal of the frame delay circuit 14 and a pull-down detection circuit 16 which detects a pull-down signal based on the present frame signal and one-frame delay signal. The frame interpolation device 1 further includes an output frame selection circuit 17 which is supplied with output signals of the frame generation circuits 12, 15, 14 and a pull-down detection signal P1 and pull-down phase signal P2. An output frame of 100 Hz (PAL, SECAM specification) or 120 Hz (NTSC specification) is output from the output frame selection circuit 17.

The detail configuration of the pull-down detection circuit 16 is shown in FIG. 2 and it includes a delay section 21 which is supplied with a present frame signal, horizontal-vertical LPFs 22, 23 which are respectively supplied with the present frame signal and one-frame delay signal, a frame-frame difference absolute value circuit 24 which detects a difference between the outputs of the LPFs, a small area integration circuit 25 which subjects the absolute value to an integration process, a dynamic block determination circuit 26 which determines the presence of a dynamic block, an in-screen dynamic block number counter 27 which counts the number of dynamic blocks in the display screen, a dynamic frame determination circuit 28 which determines a dynamic frame with reference to a determination level, and a pull-down pattern detection circuit 29 which detects whether a pull-down pattern is present or not based on the determination result by the determination circuit.

In the frame interpolation device 1 with the above configuration, the output frame selection circuit 17 selects a to-be-output frame from three signals including a two-frame delay original signal F3, a one-frame delay interpolation signal F5 obtained by delaying the present frame interpolation signal F4 by one frame and a two-frame delay interpolation signal F6 obtained by further delaying the one-frame delay interpolation signal F5 by one frame based on the pull-down detection signal P1 and pull-down phase signal P2 and outputs the thus selected frame.

Generally, the two-frame delay original signal F3 and one-frame delay interpolation signal F5 are alternately output, but when the pull-down signal is detected, a frame output according to the pull-down phase detected at this time is switched to the one-frame delay interpolation signal F5 or two-frame delay interpolation signal F6 from the original frame.

By performing the above process, a circuit having a larger configuration in comparison with the conventional device is not required and even when a cinema signal subjected to the pull-down process is input, a moving picture scene can be displayed. Next, the frame interpolation process is explained in detail with reference to the accompanying drawings.

<Frame Interpolation Process According to One Embodiment of this Invention>

The frame interpolation process in one embodiment of this invention is explained in detail with reference to the accompanying drawings.

Two points of the frame interpolation process of the present embodiment are explained below.

1. In a device which creates a new frame based on a present frame signal and a one-frame delay signal obtained by subjecting the present frame signal to a one-frame delay process, performs the interpolation process and detects a pull-down signal, generally, a newly created interpolation frame is inserted between the present frame signal and the one-frame delay signal and the original frame and interpolation frames are alternately output. However, when the pull-down signal is detected and at the time of the specified phase in the pull-down sequence, the order of frames to be output is changed and an interpolation frame is output instead of the original frame.

2. The correlation is detected based on the present frame signal and the one-frame delay signal and whether the correlation coincides with the pull-down sequence or not is determined. When coincidence occurs, a pull-down detection signal and a pull-down phase signal indicating a corresponding phase in the pull-down sequence are output.

(Difficulty in Simultaneously Displaying Cinema Signal at Double Speed of 120 Frames)

Figure 3:
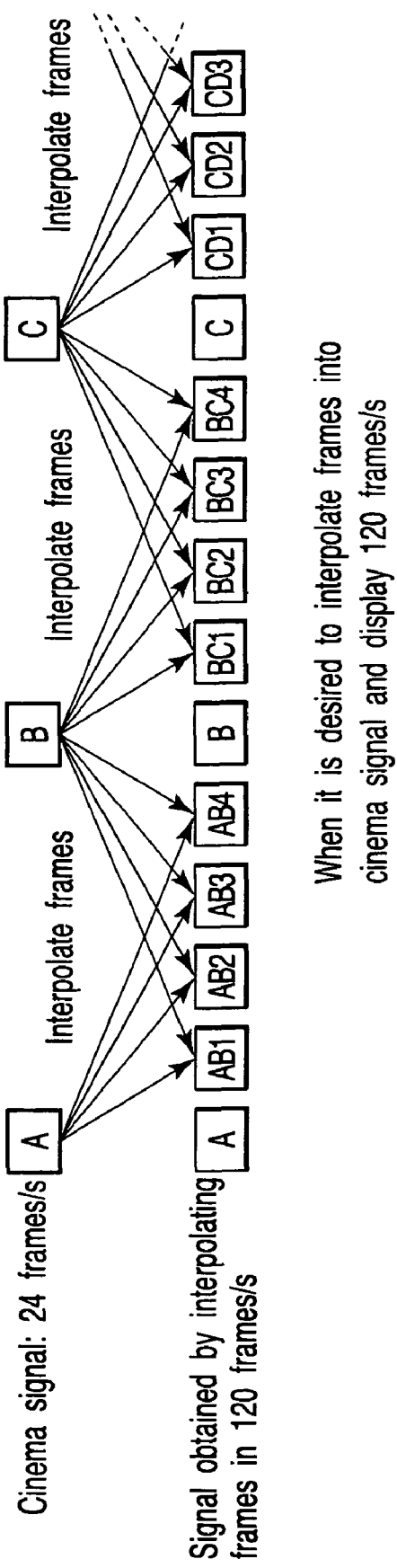
FIG. 3 is a schematic diagram showing a case wherein a cinema signal of 24 frames is converted into a video signal of 120 frames.

When a cinema signal is displayed at a double speed of 120 (100) frames per second, a method for outputting 120 (100) frames per second by creating a plurality of interpolation frames based on a cinema signal of 24 frames per second or a method for subjecting a cinema signal to a 2-3/2-2 pull-down process, dealing with the pull-down signal having 60 (50) frames per second as an original frame and creating an interpolation frame based on the pull-down signal may be considered. FIG. 3 is a schematic diagram showing a case wherein a cinema signal of 24 frames is converted into a video signal of 120 frames and FIG. 4 is a schematic diagram showing a case wherein a cinema signal of 24 frames is converted into a video signal of 100 frames.

As shown in FIG. 3, the display operation at a double speed of 120 frames per second can be performed by creating four different interpolation frames based on two original frames. However, since the above operation requires an extremely large-scale circuit, it is extremely difficult to realize the above operation. As shown in FIG. 4, the display operation at a double speed of 100 frames per second can be performed by creating three different interpolation frames based on two original frames. However, like the case of FIG. 3, an extremely large-scale circuit is required to realize the above operation.

Figure 4:
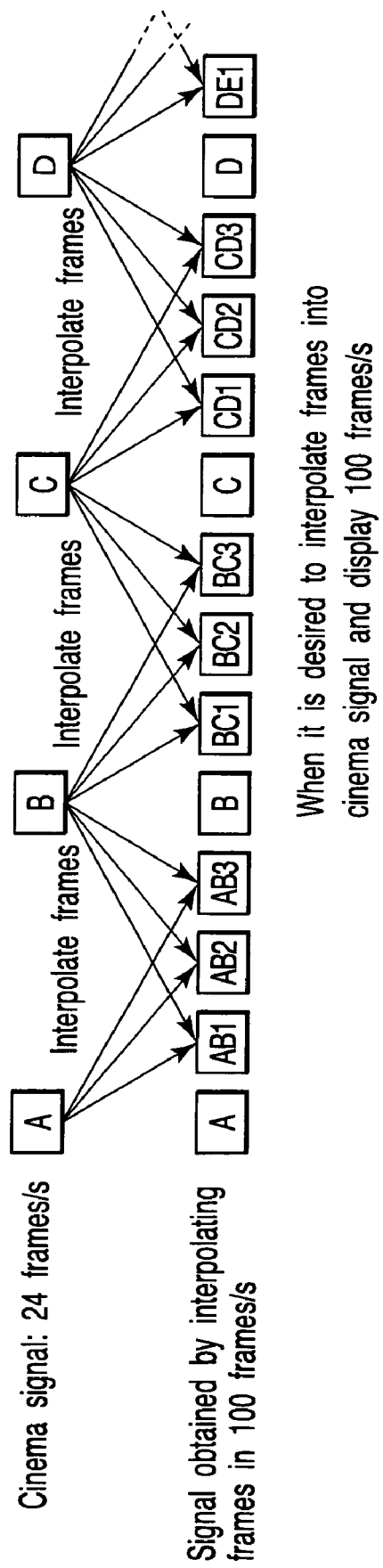
FIG. 4 is a schematic diagram showing a case wherein a cinema signal of 24 frames is converted into a video signal of 100 frames.

Since an extremely large-scale circuit is required to create a plurality of interpolation frames based on the two original frames shown in FIGS. 3 and 4, it is practically difficult to realize the above operation. Therefore, conventionally, it is a common practice to deal with a signal subjected to the pull-down process as an original frame and create an interpolation frame.

(Explanation for Interpolation Process Using Flowchart)

Figure 5:
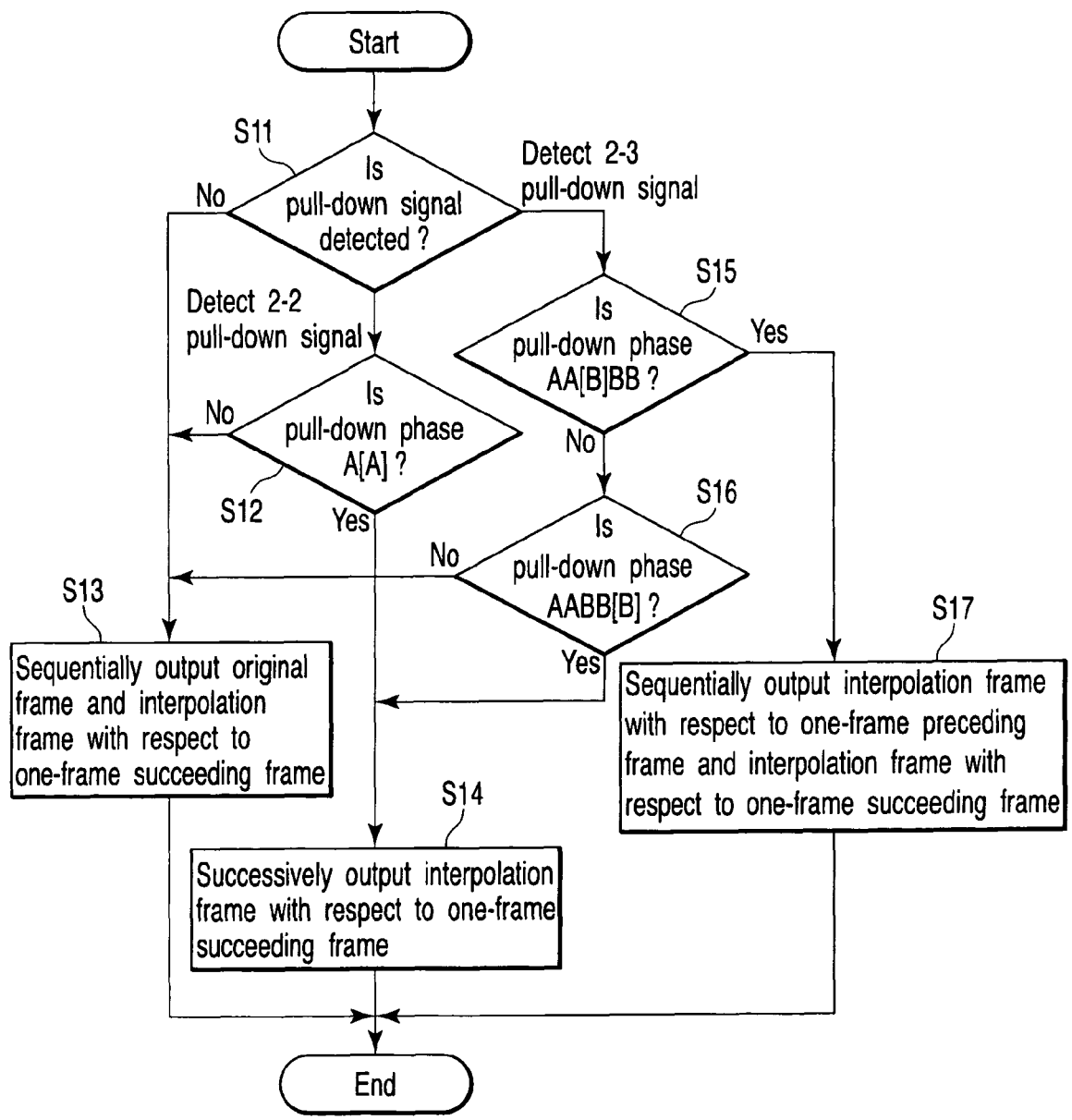
FIG. 5 is a flowchart for illustrating one example of an interpolation process in the frame interpolation device according to one embodiment of this invention.

FIG. 5 is a flowchart for illustrating one example of an interpolation process of the frame interpolation device according to one embodiment of this invention. The respective steps in the flowchart shown in FIG. 5 can be replaced by circuit blocks, and therefore, the steps of the flowchart can all be redefined as blocks.

In the flowchart of FIG. 5, when a pull-down signal is not detected (step S11), the output frame selection circuit 17 shown in FIG. 1 performs the step S13 to alternately output the original frame and an interpolation frame with respect to a one-frame succeeding original frame (step S13).

However, the output frame selection circuit 17 does not output an original frame depending on the pull-down phase when a 2-3 pull-down signal is detected (step S11).

When the pull-down phase is "AA[B]BB" (step S15), the output frame selection circuit 17 outputs an interpolation frame with respect to a one-frame preceding frame and an interpolation frame with respect to a one-frame succeeding frame (step S17). However, at the time of "AABB[B]" (step S16), the output frame selection circuit 17 successively outputs interpolation frames with respect to a one-frame succeeding frame (step S14). Likewise, when a 2-2 pull-down signal is detected (step S1) and the pull-down phase is "A[A]" (step S12), the output frame selection circuit 17 successively outputs interpolation frames with respect to a one-frame succeeding frame (step S14).

(Interpolation Process for 60 Hz Frames)

Figure 6:
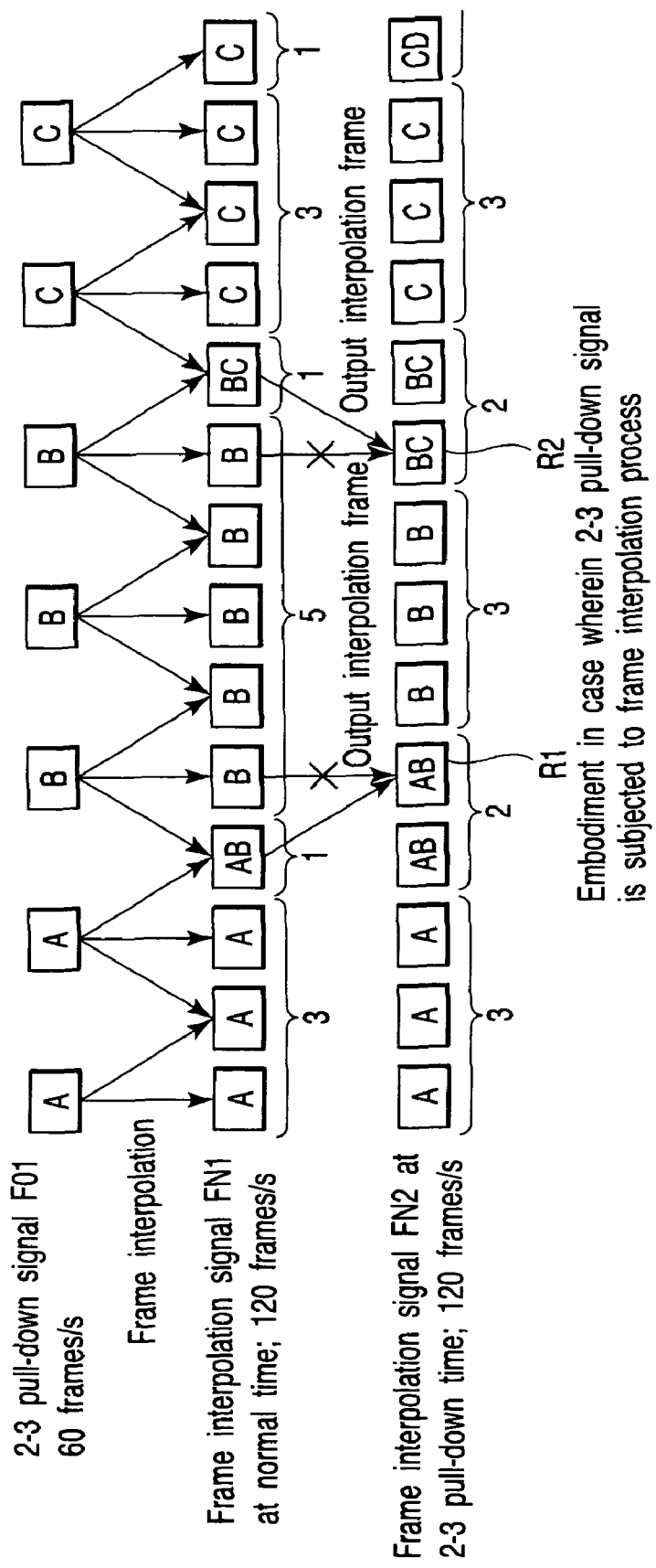
FIG. 6 is an explanatory diagram showing one example of an interpolation process of a 2-3 pull-down signal in the frame interpolation device according to one embodiment of this invention.

Next, the concrete frame process is explained with reference to the accompanying drawings. FIG. 6 is an explanatory diagram showing one example of an interpolation process of a 2-3 pull-down signal in the frame interpolation device according to one embodiment of this invention.

As indicated by a 2-3 pull-down signal (60 frames/s) F01 in FIG. 6, since a cinema signal is generally a signal of 24 frames per second, a pull-down process of successively displaying three same frames based on one frame of the cinema signal and successively displaying two same frames based on the next frame of the cinema signal is performed and the cinema signal is converted into a 2-3 pull-down signal of 60 frames per second by repeatedly performing the above process and is displayed. Therefore, in the 2-3 pull-down scene, the same frames are displayed on a cycle of "3-2-3-2-...".

As indicated by the normal frame interpolation signal FN1 in FIG. 6, the period or cycle of the frames to be output is set to "3-1-5-1-3-1-..." with respect to the 2-3 pull-down signal and the smooth output order cannot be attained.

Figure 7:
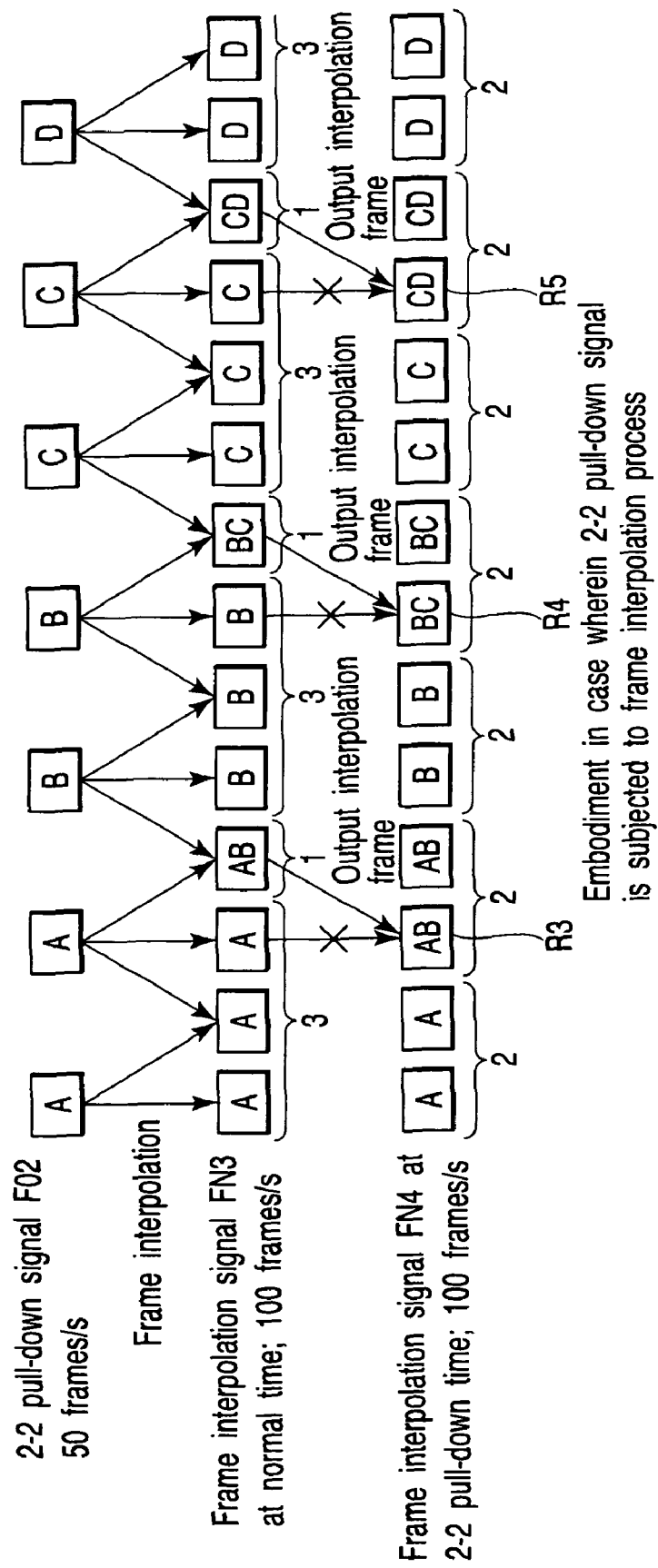
FIG. 7 is an explanatory diagram showing one example of an interpolation process of a 2-2 pull-down signal in the frame interpolation device according to one embodiment of this invention.

Therefore, in the frame interpolation device 1 of FIG. 7, when a 2-3 pull-down signal P1 is detected in the present frame original signal F1 and a one-frame delay original signal F2, the original frame and interpolation frame are alternately output as shown by the frame interpolation signal FN2 at the 2-3 pull-down time of FIG. 6. In addition to this, at the time of a specified phase (a phase at which the original cinema signal is switched) in the pull-down sequence, that is, when the first and last frames of the five same frames successively output among the frames output are output on a cycle of "3-1-5-1-3-1-..." (R1, R2), interpolation frames before and after the original frame are output instead of the original frame so as to output a smooth moving picture.

(Interpolation Process of 50 Hz Frames)

Next, the interpolation process of 50 Hz frames is explained with reference to FIG. 7. FIG. 7 is an explanatory diagram showing one example of an interpolation process of a 2-2 pull-down signal of the frame interpolation device according to one embodiment of this invention.

In FIG. 7, like the case of the 2-3 pull-down signal, since a cinema signal has 24 frames per second, a pull-down process of successively displaying two same frames based on one frame of the cinema signal is performed and the cinema signal is converted into a 2-2 pull-down signal with 50 frames per second by repeatedly performing the above process and is displayed. Therefore, in a 2-2 pull-down signal (50 frames/s) F02 of FIG. 7, the same frames are displayed on a cycle of "2-2-2-2-..." in the 2-2 pull-down scene.

As shown by the normal frame interpolation signal (100 frames/s) FN3 of FIG. 7, when the 2-2 pull-down signal is subjected to the conventional frame interpolation process, the cycle of the frames to be output is set to "3-1-3-1-..." and the smooth output order cannot be attained.

Therefore, when a 2-2 pull-down signal is detected in the present frame original signal F1 and one-frame delay original signal F2 shown in the frame interpolation device 1 of FIG. 1, an original frame and interpolation frame are alternately output as shown by the frame interpolation signal (100 frames/s) FN4 at the 2-2 pull-down time of FIG. 7. In addition to this, at the time of a specified phase (a phase in which the original cinema signal is switched) in the pull-down sequence, that is, when the last (or first) frame of three same frames successively output among the frames output on a cycle of "3-1-3-1-..." is output (R3, R4, R5), interpolation frames after (or before) the original frame are output instead of the original frame so as to output a smooth moving picture.

(Process in Output Frame Selection Circuit 17)

Figure 8:
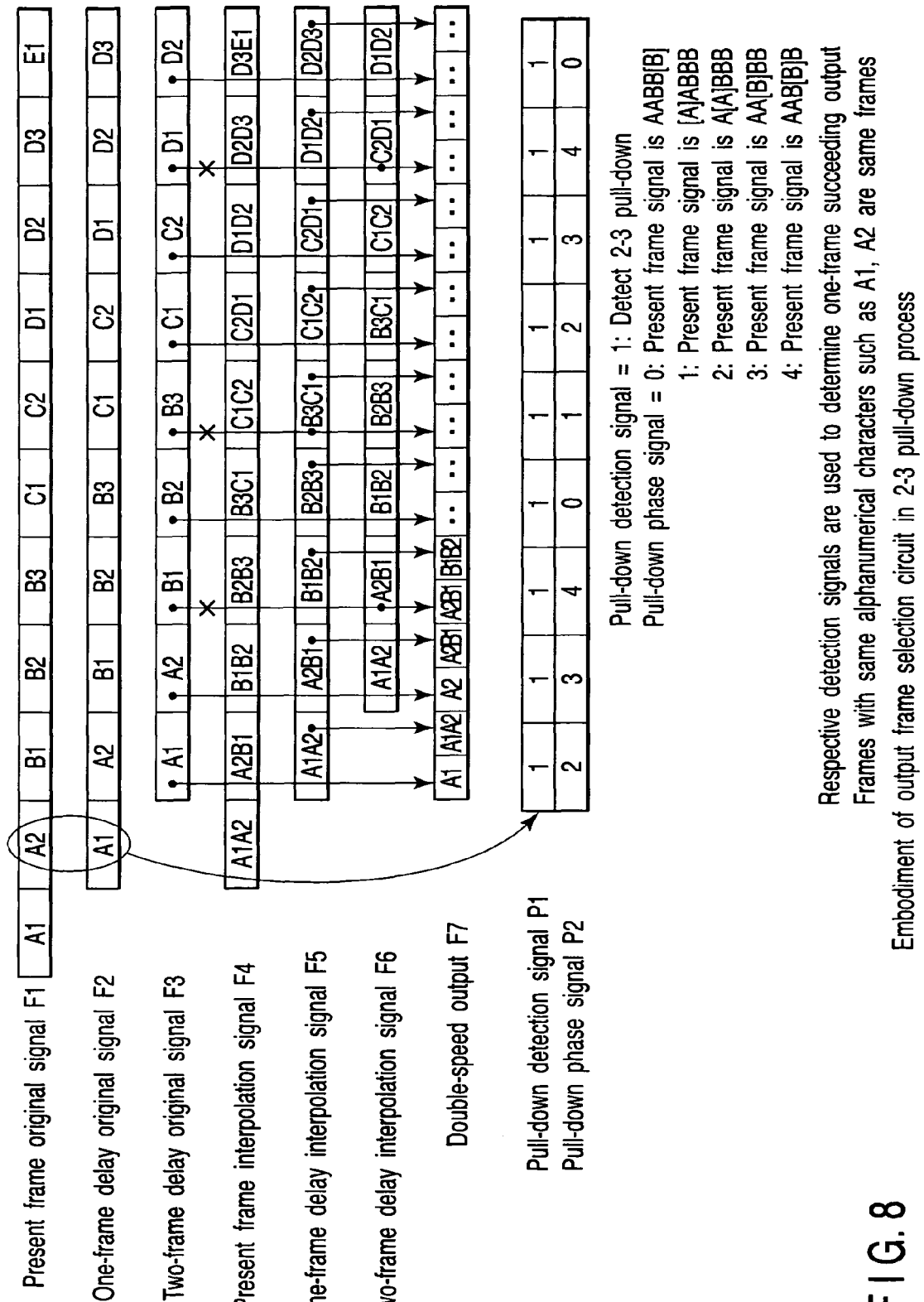
FIG. 8 is an explanatory diagram showing one example of an interpolation process of a 2-3 pull-down signal in the frame interpolation device according to one embodiment of this invention.

Next, an interpolation process of 60 Hz frames and an interpolation process of 50 Hz frames are explained with reference to the concrete explanatory diagrams of FIGS. 8 and 9. FIG. 8 is an explanatory diagram showing one example of an interpolation process of a 2-3 pull-down signal in the frame interpolation device according to one embodiment of this invention and FIG. 9 is an explanatory diagram showing one example of an interpolation process of a 2-2 pull-down signal in the frame interpolation device according to one embodiment of this invention.

Figure 9:
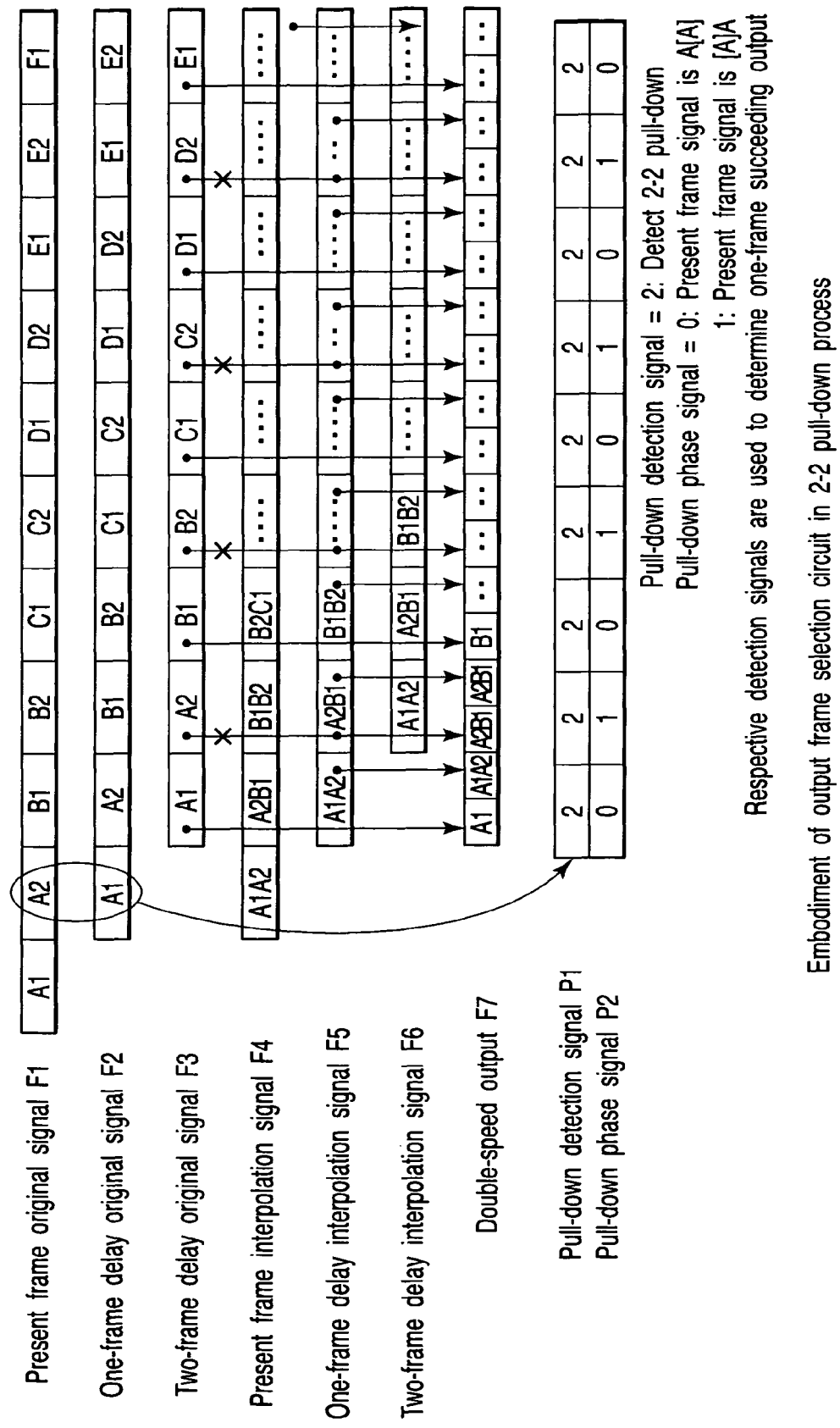
FIG. 9 is an explanatory diagram showing one example of an interpolation process of a 2-2 pull-down signal in the frame interpolation device according to one embodiment of this invention.

In FIGS. 8 and 9, the frame signals F1 to F7, pull-down detection signal P1 and pull-down phase signal P2 shown in the frame interpolation device 1 of FIG. 1 correspond to signals F1 to F7, P1 and P2 shown in FIGS. 8 and 9.

The pull-down detection circuit 16 generates a pull-down detection signal P1 and pull-down phase signal P2 based on the present frame original signal F1 and one-frame delay original signal F2 and the result is used to select an output frame which is delayed by two frames with respect to the present frame signal. Generally, a two-frame delay original signal F3 is output as an original frame and a one-frame delay interpolation signal F5 is output as an interpolation frame.

2-3 Pull-Down Process

That is, in FIG. 8, the frame signals F1 to F7, pull-down detection signal P1 and pull-down phase signal P2 shown in the frame interpolation device 1 of FIG. 1 correspond to the signals F1 to F7, P1 and P2 shown in FIGS. 8 and 9. A case wherein the present frame original signal F1 and one-frame delay original signal F2 are respectively set to B2 and B1 is taken as an example. In this case, the pull-down phase of the present frame original signal which is the 2-3 pull-down signal is "AAB[B]B". That is, the pull-down phase of the two-frame delay original signal F3 output in the next frame corresponds to "AA[B]BB". Therefore, in the next frame output at the double speed output F7, interpolation frames A2B1, B1B2 are output instead of the normal original frame B1 and interpolation frame B1B2.

Further, when the present frame original signal F1 and one-frame delay original signal F2 are respectively set to B3 and C1, the pull-down phase of the present frame original signal F1 which is the 2-3 pull-down signal is "[A]ABBB". That is, the pull-down phase of the two-frame delay original signal F3 output in the next frame corresponds to "AABB[B]". Therefore, in the next frame output at the double speed output F7, interpolation frames B3C1 are successively output instead of the normal original frame B3 and interpolation frame B3C1.

2-2 Pull-Down Process

In FIG. 9, the frame signals F1 to F7, pull-down detection signal P1 and pull-down phase signal P2 shown in the frame interpolation device 1 of FIG. 1 correspond to the signals F1 to F7, P1 and P2 shown in FIGS. 8 and 9.

In a case wherein the present frame original signal F1 and one-frame delay original signal F2 are respectively set to B1 and A2, the pull-down phase of the present frame original signal F1 which is the 2-2 pull-down signal is "[A]A". That is, the pull-down phase of the two-frame delay original signal F3 output in the next frame corresponds to "A[A]".

Therefore, in the next frame output at the double speed output F7, interpolation frames A2B1 are successively output instead of the normal original frame A2 and interpolation frame A2B1.

Effect of 2-3 Pull-Down Process

Figure 10:
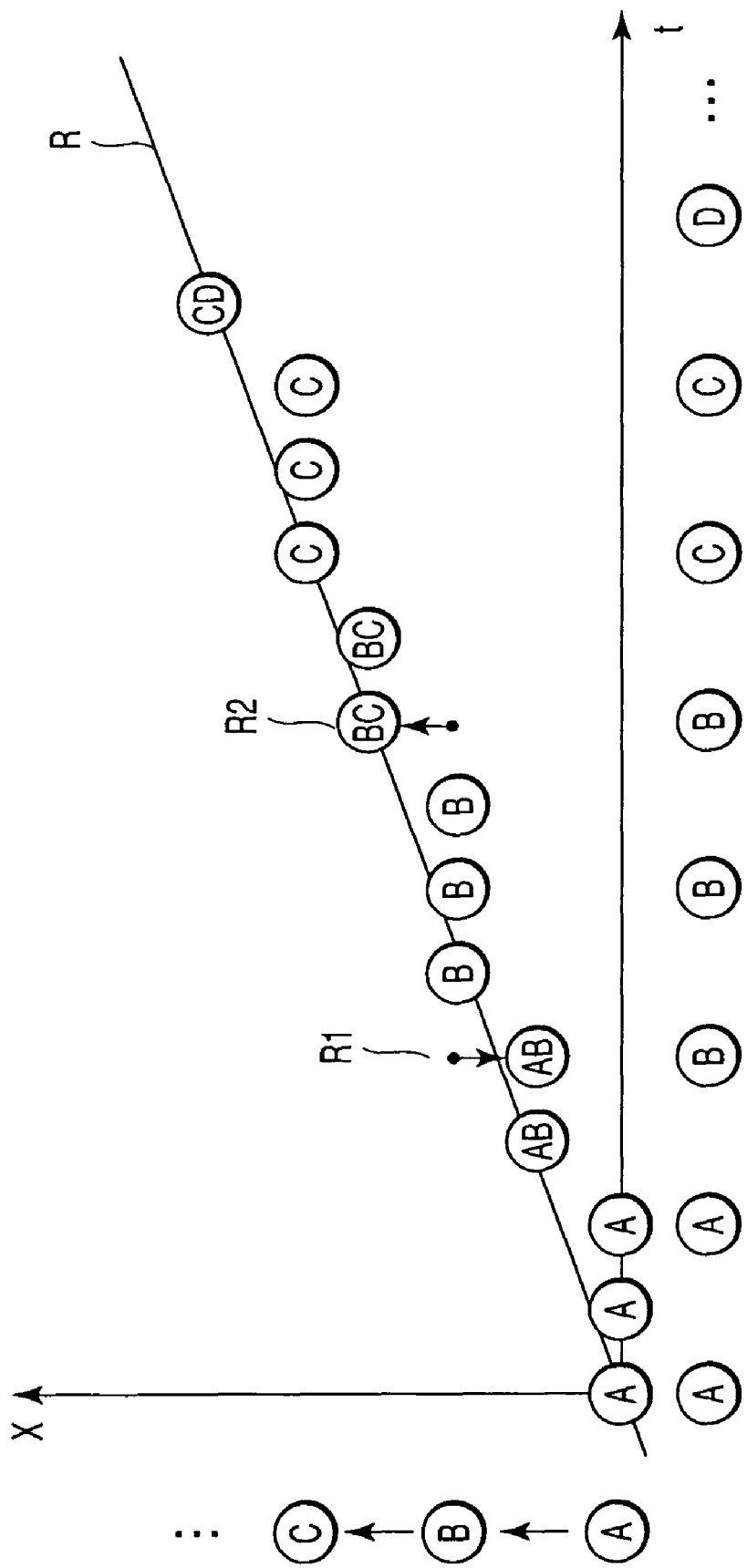
FIG. 10 is a graph showing one example of the effect attained by the interpolation process of the frame interpolation device according to one embodiment of this invention.

Next, the video image smoothing effect by the 2-3 pull-down process is considered. FIG. 10 is a graph showing one example of the effect attained by the interpolation process of the frame interpolation device according to one embodiment of this invention. Now, a case wherein an object (not shown) on frames "A", "B" and "C" moves the equal distance at one time in an x direction as shown in FIG. 10 is considered. In this case, a smooth moving picture screen can be realized by arranging the frames along an idealistic movement line R with time t.

It is understood in FIG. 10 that a smooth 120 Hz frame signal FN2 can be realized as a whole by setting the frame "B" to a frame "AB" on a point R1 and setting the frame "B" to a frame "BC" on a point R2.

Effect of 2-2 Pull-Down Process

Figure 11:
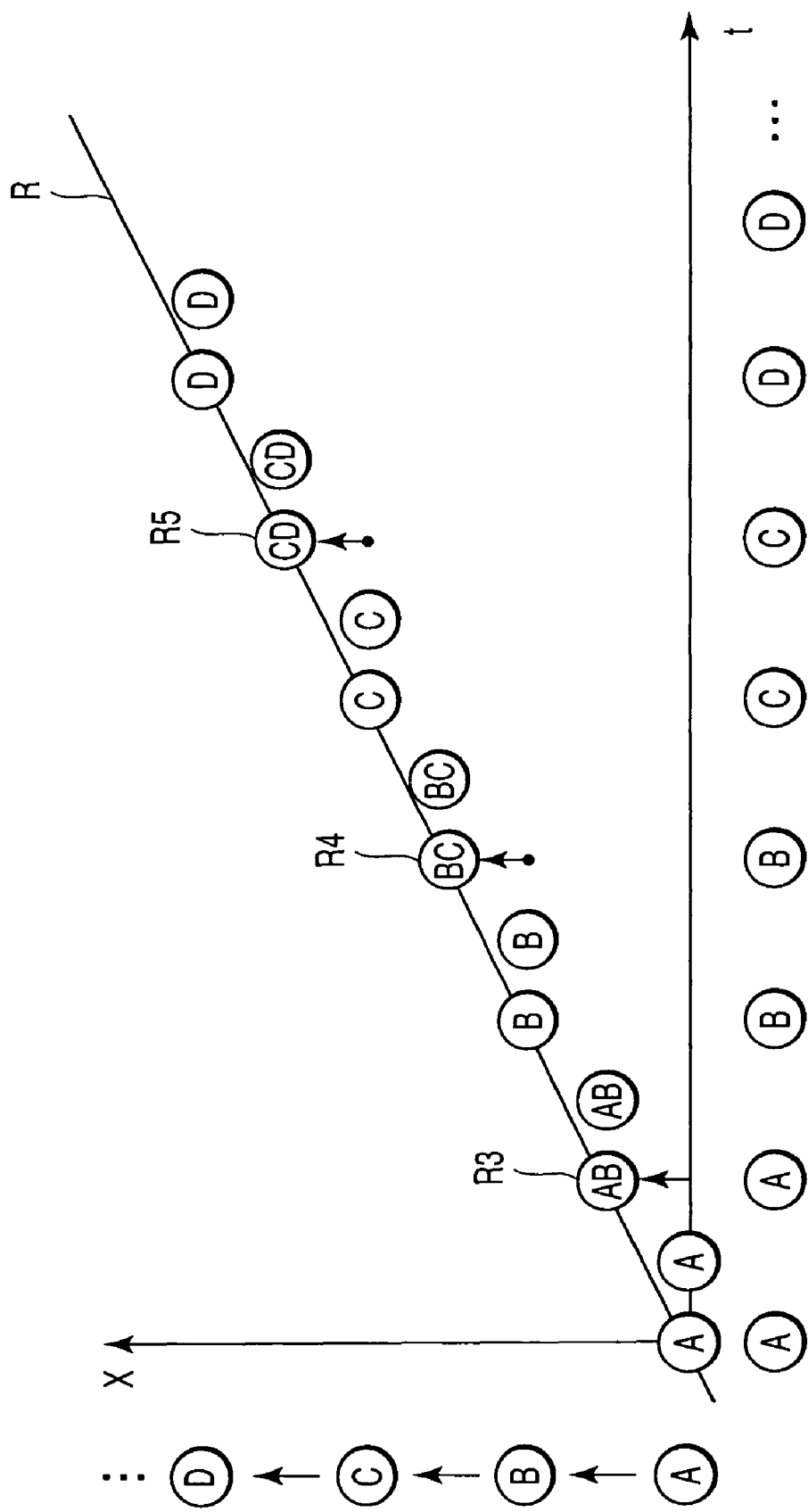
FIG. 11 is a graph showing another example of the effect attained by the interpolation process of the frame interpolation device according to one embodiment of this invention.

Next, the video image smoothing effect by the 2-2 pull-down process is considered. FIG. 11 is a graph showing another example of the effect attained by the interpolation process of the frame interpolation device according to one embodiment of this invention. Now, a case wherein an object (not shown) on frames "A", "B" and "C" moves the equal distance at one time in an x direction as shown in FIG. 11 is considered. In this case, a smooth moving picture screen can be realized by arranging the frames along an idealistic movement line R with time t.

It is understood in FIG. 11 that a smooth 100 Hz frame signal FN4 can be realized as a whole by setting the frame "A" to a frame "AB" on a point R3, setting the frame "B" to a frame "BC" on a point R4 and setting the frame "C" to a frame "CD" on a point R5.

<Display Device Using Frame Interpolation Device According to One Embodiment of this Invention>

Figure 12:
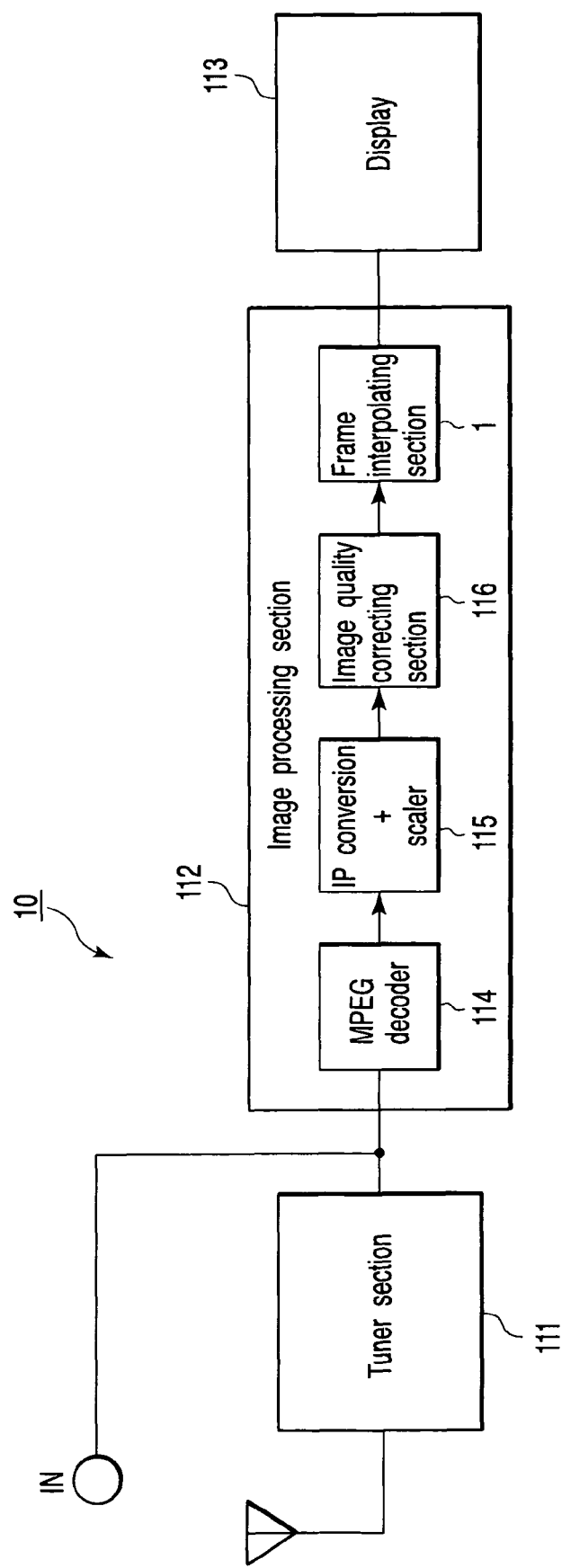
FIG. 12 is a block diagram showing one example of the configuration of a display device using the frame interpolation device according to one embodiment of this invention.

Next, one example of the display device using the frame interpolation device according to one embodiment of this invention is explained with reference to the drawing. FIG. 12 is a block diagram showing one example of the configuration of the display device using the frame interpolation device according to one embodiment of this invention.

As shown in FIG. 12, the display device 10 using the frame interpolation device according to one embodiment of this invention includes a tuner section 111 which receives an analog terrestrial or satellite signal and digital terrestrial or satellite signal and outputs an audio/video signal, an MPEG decoder 114 which subjects the audio/video signal to an MPEG decode process, an IP converting section/scaler section 115 which subjects the decoded signal to an IP converting and scaling process, an image quality correcting section 116 which performs the image quality correcting process, a frame interpolating section 1 which subjects a 60 Hz (50 Hz in the case of PAL, SECAM) video signal supplied thereto to a frame interpolation process and outputs a 120 Hz (100 Hz in the case of PAL, SECAM) video signal which is a double-speed output, and a display 113 which displays a video image corresponding to the video signal subjected to the interpolation process.

By applying the frame interpolation device 1 according to one embodiment of this invention described above to the display device 10 with the above configuration, a smooth image can be displayed in the pull-down scene in which a smooth image cannot be displayed in the conventional frame interpolation process.

In the embodiment described above, the pull-down detection signal and pull-down phase signal are generated from the pull-down detection circuit and the output frame is selected based on the signals. However, if a pull-down detection circuit is separately provided, the above operation can be realized by using a pull-down detection signal and pull-down phase signal generated therefrom.

In the embodiments described above, those who are skilled in the art can realize the present invention and easily think of various modifications of the embodiments. Further, those who have no inventive abilities can apply this invention to various embodiments. Therefore, this invention can be applied to a wide range which is not inconsistent with the disclosed principle and new features and is not limited to the above embodiment.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A frame interpolation device comprising:
a detecting section which receives a frame signal of one of 50 Hz and 60 Hz and detects whether the frame signal is a pull-down signal,
first generation section for generating a first frame signal of one of 100 Hz and 120 Hz by use of a first insertion pattern based on the frame signal of one of 50 Hz and 60 Hz,
second generation section for generating a second frame signal of one of 100 Hz and 120 Hz by use of a second insertion pattern based on the frame signal of one of 50 Hz and 60 Hz, and
a selecting section which outputs the first frame signal received from the first generation section when the frame signal is not a pull-down signal and outputs the second frame signal from the second generation section when the frame signal is a pull-down signal,
wherein the second generation section generates the frames of 120 Hz as "A", "A", "A", "AB", "AB", "B", "B", "B", "BC", "BC", "C", "C", "C" . . . when the frames of the 2-3 pull-down signal of 60 Hz are given as "A", "A", "B", "B", "B", "C", "C" . . . and
wherein "AB" indicates an interpolation frame formed based on frames A and B, and "BC" indicates an interpolation frame formed based on frames B and C.

2. The frame interpolation device according to claim 1, wherein the detecting section receives a frame signal of 60 Hz and detects a 2-3 pull-down signal.

3. An image display device comprising:
   a detecting section which receives a frame signal of one of 50 Hz and 60 Hz and detects whether the frame signal is a pull-down signal,
   first generation section for generating a first frame signal of one of 100 Hz and 120 Hz by use of a first insertion pattern based on the frame signal of one of 50 Hz and 60 Hz,
   second generation section for generating a second frame signal of one of 100 Hz and 120 Hz by use of a second insertion pattern based on the frame signal of one of 50 Hz and 60 Hz,
   a selecting section which outputs the first frame signal when the frame signal is not a pull-down signal and outputs the second frame signal when the frame signal is a pull-down signal, and
   a display section which displays a video image on a display screen based on the second frame signal of one of 100 Hz and 120 Hz supplied from the selecting section,
   wherein the second generation section generates the frames of 120 Hz as "A", "A", "A", "AB", "AB", "B", "B", "B", "BC", "BC", "C", "C", "C" . . . when the frames of the 2-3 pull-down signal of 60 Hz are given as "A", "A", "B", "B", "B", "C", "C" . . . and
   wherein "AB" indicates an interpolation frame formed based on frames A and B, and "BC" indicates an interpolation frame formed based on frames B and C.

4. The image display device according to claim 3, wherein the detecting section receives a frame signal of 60 Hz and detects a 2-3 pull-down signal.

5. A frame interpolation method comprising:
   receiving a frame signal of one of 50 Hz and 60 Hz and detecting whether the frame signal is a pull-down signal,
   generating a first frame signal of one of 100 Hz and 120 Hz by use of a first insertion pattern based on the frame signal of one of 50 Hz and 60 Hz,
   generating a second frame signal of one of 100 Hz and 120 Hz by use of a second insertion pattern based on the frame signal of one of 50 Hz and 60 Hz,
   outputting the first frame signal when the frame signal is not a pull-down signal, and
   outputting the second frame signal when the frame signal is a pull-down signal,
   wherein the generating of the second frame signal generates the frames of 120 Hz as "A", "A", "A", "AB", "AB", "B", "B", "B", "BC", "BC", "C", "C", "C" . . . when the frames of the 2-3 pull-down signal of 60 Hz are given as "A", "A", "B", "B", "B", "C", "C" . . . and
   wherein "AB" indicates an interpolation frame formed based on frames A and B, and "BC" indicates an interpolation frame formed based on frames B and C.

\* \* \* \* \*